United States Patent [19]
Auth

[11] 3,989,938
[45] Nov. 2, 1976

[54] INTERFEROMETER SPECTROMETER FOR DISCRETE FREQUENCY ANALYSIS OF EMISSION OR ABSORPTION SPECTRA AND METHOD

[75] Inventor: Gerald L. Auth, Laguna Beach, Calif.

[73] Assignee: Eocom Corporation, Irvine, Calif.

[22] Filed: Nov. 7, 1974

[21] Appl. No.: 521,796

Related U.S. Application Data

[62] Division of Ser. No. 265,742, June 23, 1972, abandoned.

[52] U.S. Cl............................. 235/151.35; 235/156; 356/106 S
[51] Int. Cl.$^2$........................................ G06F 15/34
[58] Field of Search...................... 235/151.35, 156; 356/106 S; 250/336

[56] References Cited
UNITED STATES PATENTS

| | | | |
|---|---|---|---|
| 3,488,123 | 1/1970 | Nichols | 356/106 S |
| 3,556,661 | 1/1971 | Hepner | 356/106 S |
| 3,636,333 | 1/1972 | Klund | 235/156 |
| 3,728,030 | 4/1973 | Hawes | 356/106 S |
| 3,745,317 | 7/1973 | Berthier | 235/156 |

FOREIGN PATENTS OR APPLICATIONS

| | | | |
|---|---|---|---|
| 1,456,643 | 9/1966 | France | 356/106 S |

OTHER PUBLICATIONS

Yoshinaga: A Far Infrared Interferometric Spectrometer with a Special Electronic Computer, Applied Optics, July 1966, vol. 5, No. 7, pp. 1159–1165.

Michel: Real Time Computer for Monitoring a Rapid-Scanning Fourier Spectrometer, Applied Optics, Nov. 1972, vol. 11, No. 11, pp. 2671–2674.

*Primary Examiner*—Jerry Smith
*Attorney, Agent, or Firm*—Flehr, Hohbach, Test, Albritton & Herbert

[57] ABSTRACT

An interference spectrometer which analyzes an unknown light beam for determining the presence and amount of particular frequency by passing the light beam through an interferometer with a moving mirror, which transforms the beam into a first signal which represents the inverse Fourier transform of the electrical light beam. An associated laser beam is also processed by the interferometer and detected to give a second signal. The first signal is sampled at each periodic variation of the second to generate a discrete signal which is then digitized. A digital Fourier series frequency component synthesizer synthesizes preselected discrete frequency components of the incoming beam which correspond, for example, to the gaseous components of interest. A particular gas handling apparatus is disclosed which is adapted to handle unstable inhomogeneous gases such as automobile exhaust fumes.

12 Claims, 17 Drawing Figures

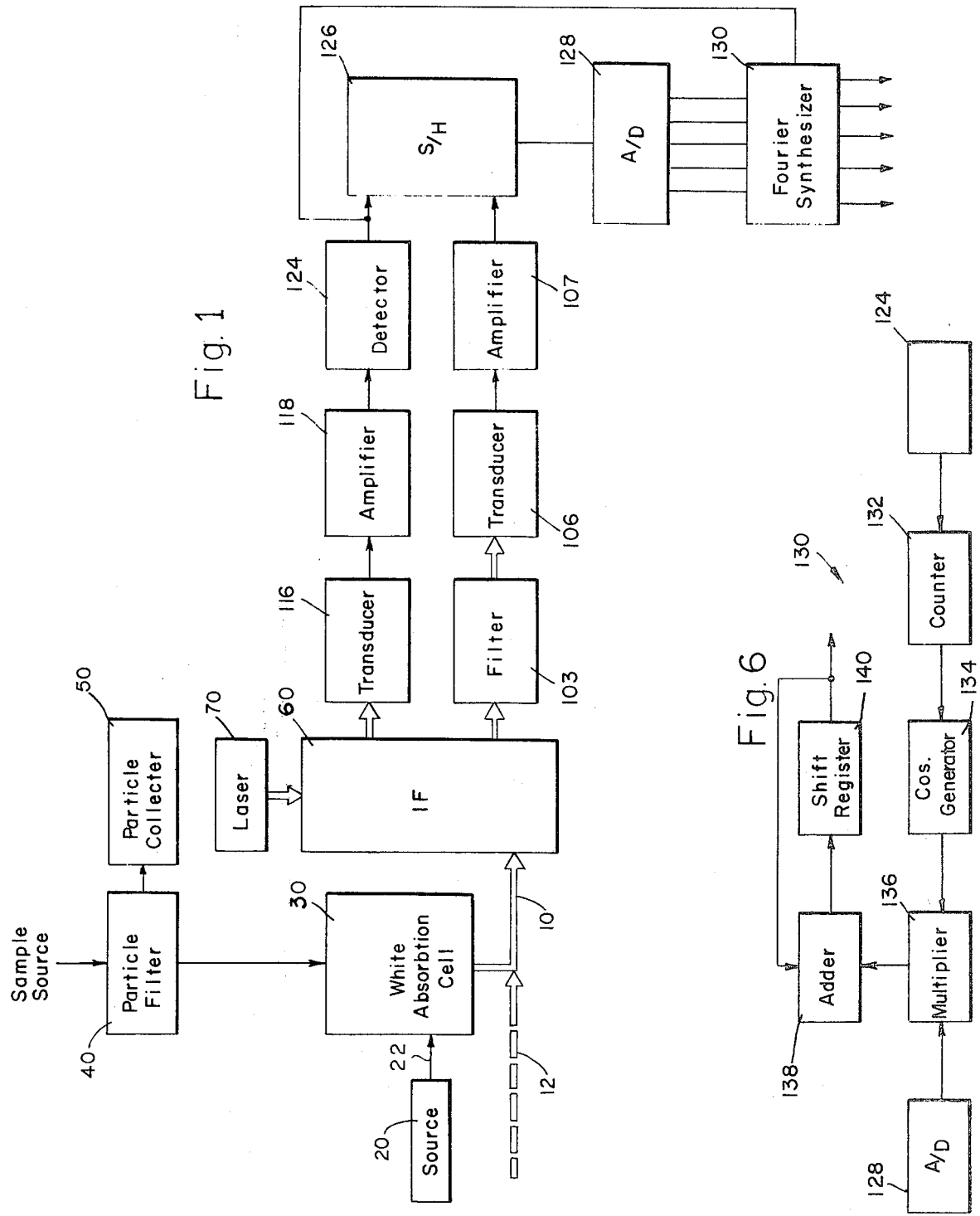

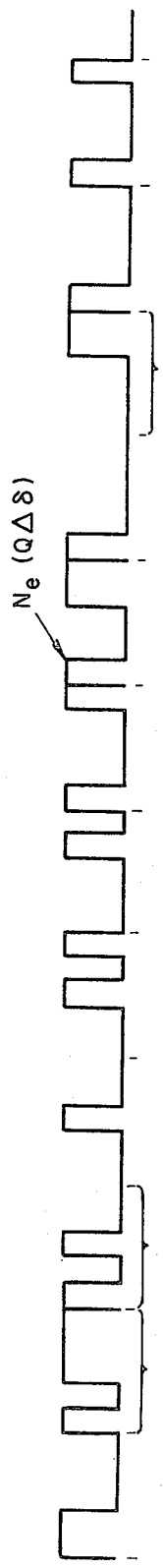
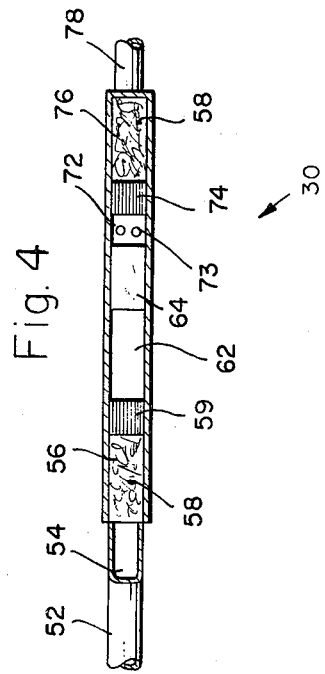
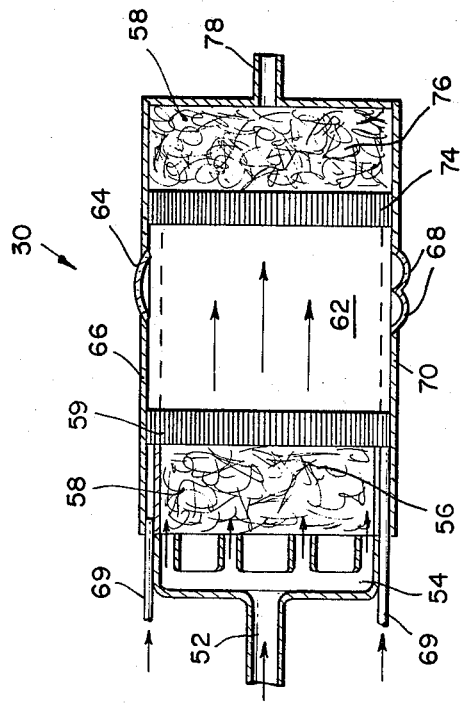
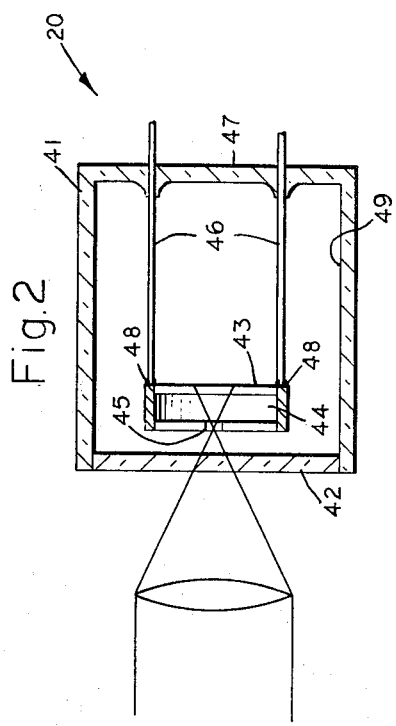

INTERFEROMETER SPECTROMETER FOR DISCRETE FREQUENCY ANALYSIS OF EMISSION OR ABSORPTION SPECTRA AND METHOD

This is a division, of application Ser. No. 265,742 filed June 23, 1972 and now abandoned.

BACKGROUND OF THE INVENTION

This invention generally relates to interferometer spectrometers and more specifically to improved techniques for determining the presence and magnitude of particular discrete frequency components of light of unknown spectral content, and to an improved absorption gas cell and source for use therewith. In a particular application, this invention finds use for the rapid determination of the composition of engine exhaust gasses by means of an interferometer spectrometer system which measures the amount of light absorbed by exhaust gasses at discrete, preselected frequencies in the infrared. As used herein, light includes electromagnetic energy throughout the infrared, visible and ultraviolet, although the specific system disclosed is directed to use in the infrared.

Heretofore, the analyses of spectra containing information concerning the emission or absorption of light have been used to identify the material generating the light or a material through which the light has been passed and been partially absorbed. As an example, infrared spectral analysis of absorption finds particular use in gas sample analysis, such as could be employed in in the studies of exhaust from factories or engines. In the latter application there is a large potential use for accurate analysis of automotive exhaust. In such applications certain discrete frequencies of emission or absorption can be correlated to the unknown quantity of a constituent of the gas being analyzed. In automotive exhaust analysis, certain constituents of the exhaust gas are responsible for its smog producing potential and can be analyzed by passing a wide band light beam through the exhaust gas and measuring the light attenuation at particular absorption frequencies which characterize these constituents.

Interference spectroscopy has been useful for measuring infrared light and has been known for some time. In general, the interference fringe pattern of the interferometer is one of a Fourier transform pair with respect to the frequency spectra of interest, and could be transformed in a general purpose computer to yield the spectra. This is unduly expensive.

U.S. Pat. No. 3,482,919 to Anthony R. Barringer suggests passing light through a gas sample and into an interferometer, and then using correlation techniques for comparing time varying signals derived from the light emerging from the interferometer with correlation signals characteristic of light of known spectral content.

While Barringer's method can be used to measure the presence and amount of a particular gas, several measurements would have to be performed on each engine exhaust sample, one for each gas whose presence in the sample is suspected. It is desirable to have a system which can determine the amounts of numerous suspect gasses with one test of each sample. This would reduce the amount of time involved as well as the cost particularly in the automotive industry.

U.S. Pat. No. 3,286,582 to Mertz describes a system which provides frequency spectrum information regarding the light entering the interferometer by moving a reciprocating mirror at a uniform velocity. He thereby generates a time function comprised of audio frequency components, the amplitude of which are representative of the energy of corresponding wavelength components of the incoming light. The frequency of the audio components corresponding to a component of this incoming light is given by the ratio of the uniform mirror velocity to the wavelength of that corresponding light component.

However, the information provided covers the complete frequency spectrum and is more than that necessary to determine the amount of selected components. Furthermore, the dependence on uniform movement of the moving mirror renders the system unduly delicate and, therefore, insuffiently accurate.

There is, therefore, a need for an accurate interferometer adapted for measuring the frequencies of absorption or emission contained in a spectra of a material to thereby generate reliable data on the amount of preselected components contained in the material.

In testing for the impurity content of engine exhausts by interferometric means, it is desirable to pass the sample through a light absorption chamber or cell such that incoherent light is energized to follow a multiple or long path through the cell and the components or light having frequencies characteristic of the gaseous components present will be absorbed by the impurities to a certain extent, depending on the impurity content in the sample. In one such cell, opposing mirrors provide a folded optical path which allows many traverses of the light across the path of the gas. One disadvantage of the direct use of this cell is the mirrors can become readily covered with grime in use, particularly with engine exhaust samples and reduce the accuracy and efficiency of the system.

Solid particles contained in exhaust and whose diameters are on the order of the wavelengths corresponding to the absorption frequencies of the impurities being measured are present in samples and interact with light at those frequencies thereby adversely affecting the measurements. Such particles could also accumulate on the mirrors of the absorption cell. Therefore, it is desirable to remove such particles before passing the sample through the absorption chamber and to control the flow through cell to reduce deposition of grime on the mirrors. Since the particles contribute to air pollution, it is desirable that these particles should be collected and counted or weighed to determine their contribution to the impurity content of the sample. The particular impurities typically found in engine exhaust samples have absorption frequencies in the infrared portion of the electromagnetic energy spectrum, therefore, the light source should emit light which includes all of these frequencies. Conventional light sources either have an enclosure window such as glass or quartz which blocks some of the desired light, or an exposed source which oxidizes and burns out quickly. There is a need therefore, for an enclosed source which provides a broad band light output and which has a long lifetime.

SUMMARY OF THE INVENTION AND OBJECTS

In general, it is an object of the present invention to provide an interference spectrometer sensitive to preselected, discrete frequencies and to a gas sample cell and light source for use therewith which will overcome the above mentioned limitations and disadvantages.

Further object of the present invention is to provide a spectrometer of the above character together with associated data reduction circuitry which can electronically generate quantitative information regarding the presence and amount of particular components of a gaseous mixture with relatively simple digital circuitry and generating the complete frequency spectrum and without calibration requirements.

Another object of the invention is to provide a spectrometer of the above character in which discrete frequency components of a spectrum are synthesized from an electrical signal which represents the inverse Fourier transform function of the spectrum of interest.

Another object of the invention is to provide a spectrometer of the above character and gas sample cell for determining the presence and amount of suspected components of a gaseous sample such as for example, exhaust fumes emitted from an engine.

Another object of the invention is to provide a gas sample cell utilizing a filter or particle separator which removes relatively large solid particles from the rest of the sample to be analyzed.

Another object of the invention is to provide an improved light absorption gas cell which allows a sample to enter with minimum turbulence, thereby reducing the deposition of impurities or grime on the walls of the cell.

Further object of the invention is to provide a spectrometer of the above character having a light source with a broad band light output and constructed to provide a long and reliable lifetime.

The foregoing objects are achieved in accordance with the present invention by providing an interferometer spectrometer for analyzing the emission or absorption spectra contained within an input light beam, and including an interferometer optically coupled to the beam having a moving mirror associated therewith which creates a spatial Fourier transform of the spectra of the light beam. A coherent light source is also optically coupled through the interferometer and transformed thereby through a spatial transform of the coherent light. The interferometer includes means defining first and second light output paths therefrom together with means for optically eliminating from one output path the light from the coherent source while retaining the interference pattern created from the input light beam. A first optically sensitive transducer is coupled to the first light output path for converting the pattern generated therein into a first electrical signal whose amplitude varies with the position of the moving mirror and which contains the spacial transform information concerning the input light beam. A second transducer is optically coupled to the second light output path of the interferometer for converting the interference pattern therein into a second signal which varies periodically as the mirror moves each segment of distance $\Delta\delta$, where $\delta$ is the distance the mirror has moved from a reference position. Signal generating means is provided for developing at least one sampling pulse for each periodic variation of the second signal. Signal processing means is coupled to the first transducer for processing the signal therefrom into a stepped analogue signal by sampling its value at each occurance of the sampling pulse and retaining that value until the next sampling pulse is received. An analogue-to-digital converter is coupled to the signal processing means for providing a digital signal corresponding to the value of the stepped analogue signal at each value thereof, and for delivering the digital signal to a digital line filter which multiplies the value thereof by an appropriate inverse Fourier transform element thereby generating an incremental response for each sampled value in the frequency domain of said spectra. Means are provided for adding and accumulating the digitized representation of each incremental response value over the range of mirror movement to thereby generate a total response value at the predetermined frequency.

Where the analysis of absorption spectra of gasses is contemplated, particularly from auto exhaust emissions, the gas sample is passed through a filter or particle separator which removes particles whose diameter are greater than one-tenth of the smallest wavelength spectra being investigated. The filter separates and retains these solid particles for further analysis as may be desired. In addition, a particular gas sample construction is disclosed which assures non-turbulent flow of the exhaust gasses through a chamber or cell which also permits passage of broad band light spectra.

These and other objects and features of the invention will become apparent from the following detailed description thereof when taken into conjuncture with the accompanying drawings.

BRIEF DESCRIPTION OF THE DRAWINGS

FIG. 1 is a diagram of the interferometer spectrometer constructed in accordance with the present invention and adapted for discrete frequency analysis of emission or absorption spectra.

FIG. 2 is a cross-sectional view of a broad-band, infrared light source constructed in accordance with the present invention.

FIG. 3 is a cross-sectional view of an absorption cell constructed in accordance with the present invention.

FIG. 4 is a plan view of the absorption cell in FIG. 3.

FIG. 6 is a block diagram of the digital Fourier series frequency component synthesizer of FIG. 1.

FIG. 7 through FIG. 13 are graphs of electrical signals which appear at various points of the circuitry of the interferometer spectrometer of FIG. 1.

BRIEF DESCRIPTION OF THE PREFERRED EMBODIMENT

Figure 5:
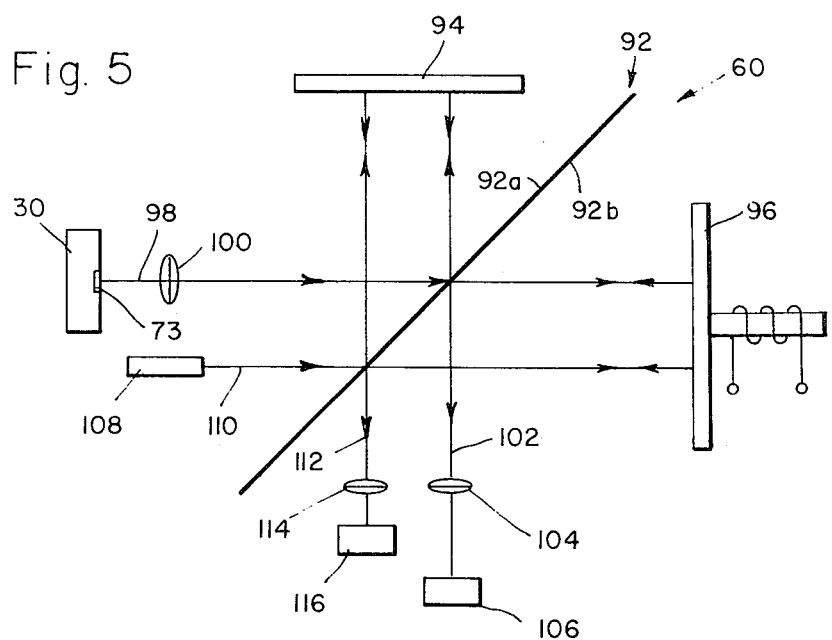
FIG. 5 is a schematic diagram of the interferometer portion of the spectrometer in FIG. 1.

Referring now generally to FIG. 1 shown in schematic block diagram form, the interferometer spectrometer of the present invention. The spectrometer is adapted to analyze either absorption spectra 10 consisting of a broad band source beam from which certain components have been absorbed or it may be used to directly analyze emission spectra 12 from a particular source. Thus, as used as an absorption spectrometer, the present invention includes broad band light source 20 having an output beam 22 which is passed through an absorption cell 30 so arranged to provide a multiple path of travel through a gas to be analyzed. The gas to be analyzed may be passed through a particle filter 40 and collector 50 which will be hereinafter described in detail, the purpose of which is to clean the gas as much as may be required to eliminate spurious responses due to entrained particulate matter. The output beam of the absorption cell or the beam 12 is passed through an interferometer generally indicated at 60. The output beam of a laser 70 is also passed through the interferometer and serves to provide a signal which varies periodically and which is used to measure the position of a moveable mirror witin the interferometer. In this way each increment of motion of the mirror can be sensed as a variation seen by a transducer 116 which is then used to supply a sampling signal to detector 124 such that the spectra being analyzed is sampled at very small increments of mirror motion by a sample-and-hold circuit 126, the other input to the sample-and-hold circuit is the filtered Fourier transform of the spectra being analyzed, as supplied through filter 103, transducer 106, and amplifier 107. Each sampled and held value of the input signal from circuit 126 is processed through an analogue-to-digital converter 128 and is then incrementally transformed by the Fourier synthesizer 130 to develop discrete frequency analysis for particular frequency or frequencies of interest. The foregoing generalized description will now be analyzed in detail in connection with reference to the remainder of the drawings.

FIG. 2 shows a broad band light source 20 constructed in accordance with this invention and includes an air-tight, evacuated housing 41, preferably of glass, is seen having a window 42 at one end. Within the housing 41 is a black body radiator 43 having a cavity 44 therein which emits black-body radiation through a pinhole 45 therein when the radiator 43 is heated. The spectral radiance emitted by the cavity 44 and measured in units of Watts/cm-steradoams, cm-steradians, is dependent on the temperature of the radiation 43 in accordance with the well known Planck radiation function.

Two electrical conductors 46 pass through and are rigidly supported by a wall 47 of the housing 41 and are in electrical contact with two electrical terminals 48 at either end of the radiator 43 as shown. Electric current furnished by an external conventional power source (not shown) is coupled by the conductors 46 to the terminals 48 causing the radiator 43 to be heated, as desired.

The radiator 43 is preferably of tungsten but may be of any of several other refractory materials.

The emissivity of such refractory metals is extremely low due to their high reflectivity characteristics. However, high emissivity ($\epsilon > 0.9$) is desirable in order to provide sufficient light intensity at tolerable temperatures, i.e. at temperatures which would not disintegrate the material. For this reason, the material would be shaped, for example, in the form of a hollow structure such as a sphere or tube with a hole in one side, the structure constituting the radiator 43 the hollow region therewithin constituting the cavity 44 and the hole constituting the pinhole 45. The radiation will then closely approximate that of an isothermal cavity, and the emissivity of the cavity 44 as viewed through the hole 45 will have an apparent emissivity close to unity.

It is preferable to have the housing 41 air tight and evacuated in order to prevent chemical interaction with the Black-body radiator 43, tungsten being chemically active, at these temperatures. Evacuating the housing 41 also keeps the temperature of the housing walls low (e.g., 600° C) by virtually eliminating convection from the radiator 43. Since the electrical conductors 46 will be externally anchored to a heat sink (not shown) there will be virtually no conduction of heat to the walls. To further reduce the heating of the housing 41 its inner surfaces 49 can be coated to reflect radiation. This will also serve to keep the housing 41 from melting, and to avoid hot spots which could ignite ambient fumes. While the housing 41 may be of glass or other suitable insulating material, the material used must have a high enough melting point to preclude melting at the operating temperatures indicated.

The window 42 is preferably of sapphire because of sapphire's ruggedness and durability, and because of its transparency to frequencies of light which are characteristic of the components of interest in the sample being tested, as in the infrared.

Referring now to FIGS. 3 and 4, there is shown an absorption chamber or cell constructed in accordance with this invention. The sample to be analyzed enters a tube 52 which terminates in a manifold 54 which distributes the sample relatively evenly into a turbulence damping compartment 56. This compartment contains material 58 such as glass wool or any other material suitable for damping gaseous turbulence. The sample then flows through a honey comb 59 which renders the flow of the sample laminar. The manifold 54, material 58 and honeycomb 59 may be said to constitute a turbulence damping system.

The sample flows from the honeycomb 59 into an absorption compartment 62 which contains a concave mirror 64 on one wall 66 and two smaller concave mirrors 68 positioned contigously on an opposite wall 70 which is parallel to the wall 66. Tubes 69 adjacent the manifold 54 pass clean air across the mirrors 64 and 68 in order to prevent the accumulation of dirt thereon. An entrance window 72 and an exit window 73 allow light to enter and leave the compartment 62. The centers of curvature of the mirrors 64 and 68 are designed to permit multiple reflections of the light, thereby providing a long optical path over which the light can be measurably absorbed by the sample.

From the compartment 62 the sample flows into a second honeycomb 74, then into a second turbulence damping compartment 76 and finally into a tube 78 from whence it can be collected as desired. The second honeycomb 74 is provided to encourage the laminar flow of the sample. The second damping compartment 76, which also contains material 58 is provided in order to collect the laminar-flowing sample and to prevent reflection of any turbulent flow that might otherwise appear.

FIG. 5 shows an interferometer 60 similar to a Michelson interferometer comprising a beam splitter 92 positioned at a 45° angle with respect to the horizontal, and having a front side 92a and a back side 92b. A fixed miror 94 is positioned horizontally above, and facing the front side 92a of the beam splitter 92. A moveable mirror 96 is positioned vertically in back of, and facing the back side 92b of the beam splitter 92.

A beam of incoherent light 98 emanating from the exit window 73 of the absorption chamber 30 is focused horizontally by a focusing lens 100 onto the beam splitter 92 where it is split, one half being reflected to the fixed mirror 94, and the other half being transmitted to moving mirror 96. These half beams are then reflected by the mirrors 94 and 96 respectively back along their respective optical paths to the beam splitter 92 where they interfer in a known manner to form an optical signal 102 comprising various frequency components. The optical path containing the fixed mirror 94 has a fixed path length, while the one with the moveable mirror 96 has a variable path length. A reference point for measuring the positions of mirror 96 will be taken herein as that position of mirror 96 where the two path lengths are equal. The position of Mirror 96, hereinafter referred to as the mirror position, is then given in units of length measured from that point. The optical signal 102 is a function of the mirror position. This signal 102 is then filtered by an optical filter 103 which transmits low frequencies and blocks high frequencies. The purpose of filter 103 will be explained subsequently. A collecting lens 104 collects the filtered signal and focuses it onto a first electro-optical transducer 106 which converts it to an electrical signal. A conventional amplifier 107 amplifies the signal as desired.

A coherent light source such as laser 108 emits a horizontal beam of coherent light 110, whose frequency is greater than the highest frequency transmitted by filter 103, onto the beam splitter 92 where it is split, as in the case of beam 98. Each beam half is incident on one of the mirrors 94 and 96 and reflected back to the beam splitter 92 where they interfere to form another optical signal 112 which is also a function of mirror position. A second collecting lens 114 collects the signal 112 and focuses it onto a second electro-optical transducer 116 which converts the signal 112 into an electrical signal. A conventional amplifier 118 amplifies this signal as desired.

Figure 7:
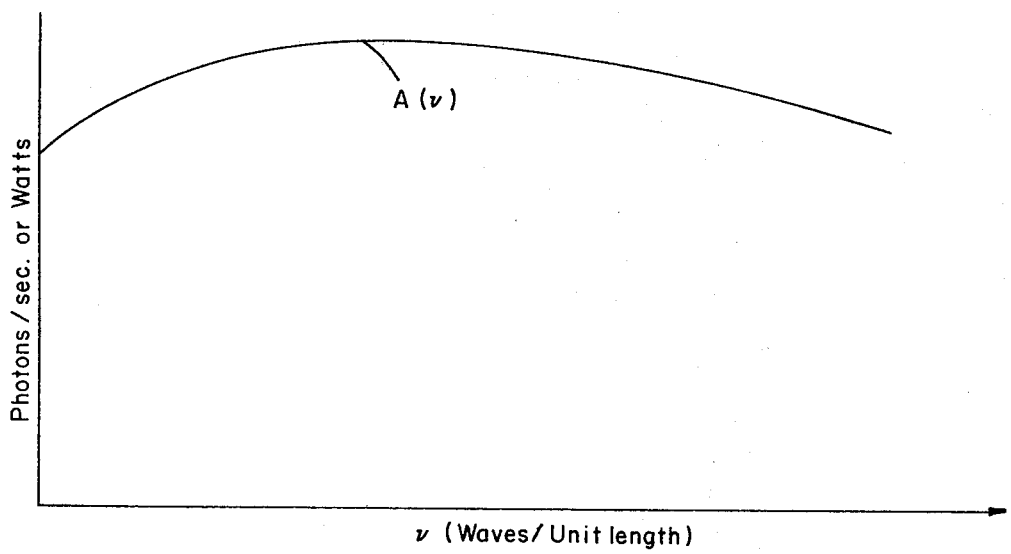
Figure 8:
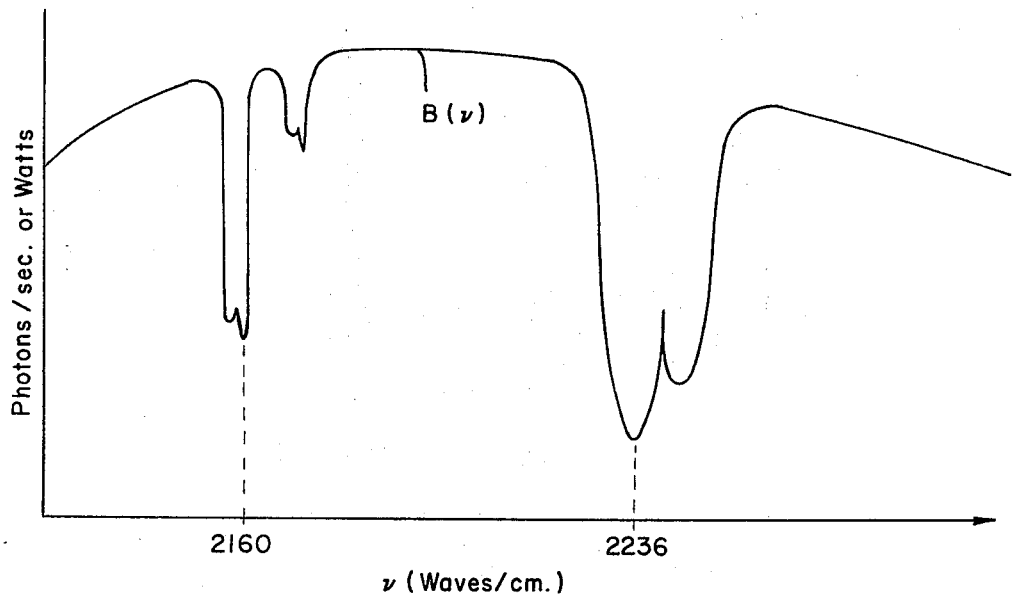

The signals emerging from the interferometer 60 are now processed electronically and the desired information is extracted as will now be described with particular reference to FIGS. 1 and 6. FIG. 1 depicts an entire system wherein a sample of engine exhaust fumes to be evaluated is diluted with air and introduced into the particle filter. Either particle filter as shown in FIGS. 13–17 to be hereinafter described may be used in which large particles in the sample are filtered out and collected in a suitable particle collector. The remaining gaseous sample enters the absorption cell 30. The light source 20 furnishes an incoherent light signal $A(\nu)$ whose intensity versus frequency is shown as the curve graphically displayed in FIG. 7, where $\nu$ is the spatial frequency expressed in terms of waves per unit length. $A(\nu)$ is expressed in either photons/second or watts, depending on whether detector 106 is a quantum detector or power detector. The light enters the absorption cell 30 where it is attenuated by the gaseous sample, as discussed previously. The emerging attenuated light signal $B(\nu)$ which resembles the intensity profile of the curve shown in FIG. 8, contains the desired sample information, and is expressed mathematically as follows:

$$B(\nu) = A(\nu)T(\nu) = A(\nu) \prod_{m=1}^{m_{max}} \text{Exp}(-X_m(\nu)W_m) = A(\nu)\text{Exp}(\sum_{m=1}^{m_{max}} -X_m(\nu)W_m)$$

where $W_m$ is the quantity of gas m in the absorption cell, $X_m(\nu)$ is an absorption characteristic of gas $m$, and $T(\nu)$ is the transmission spectrum of the absorption cell 30 due to the gases $m = 1, 2, \ldots m_{max}$, all present therein. The sample is diluted by air for convenience, but this does not affect the operation of the invention as will be seen from subsequent discussion. The sample is then expelled to the atmosphere, or to a chamber such as a balloon or plastic bag, where it can be stored for further reference if desired.

The attenuated light signal, $B(\nu)$, enters the interferometer for optical processing. As is well known, the output signal from a Michelson interferometer as a function of mirror position (commonly referred to as an interferogram) is expressed mathematically as the inverse Fourier transform of the product of the spatial frequency spectrum of the incoming light and the transfer function of the interferometer. In the case of the present invention a transfer function $S(\nu)$ is defined, which takes account of the combined effect of the interferometer efficiency, the filter 103 transfer characteristics, and the detector 106 sensitivity, such that when the mirror displacement is not limited to finite values, the spectrum of the output signal of the detector 106 is $E_o(\nu) = B(\nu)S(\nu)$. Therefore, if the displacement of mirror 96 were not finite, the output signal from the detector 106 would be the inverse Fourier transform of $E_o(\nu)$, and would be expressed as $e_o(\delta)$ where $\delta$ is the displacement of the mirror 96 from the aforementioned reference point. For an ideal interferometer $e_o(\delta)$ and $E_o(\nu)$ are cosine transform pairs and may be expressed thus:

$$e_o(\delta) = 2 \int_0^\infty E_o(\nu)\cos(4\pi\nu\delta)d\nu$$

$$E_o(\nu) = 2 \int_0^\infty e_o(\delta)\cos(4\pi\nu\delta)d\delta.$$

To account for the finite mirror 96 displacement, an interferometer profile function, $P(\nu)$, is defined as having a cosine transform function $p(\delta)$ equal to unity for $0<\delta<\delta_{max}$ and equal to zero elsewhere. This function $p(\delta)$ is commonly referred to as the truncation function of the interferogram. The instrument spectral response for finite displacement of mirror 96, $E(\nu)$, is the convolution of $E_o(\nu)$ with $P(\nu)$. Thus:

$$E(\nu) = E_o(\nu) * P(\nu)$$

Figure 9:
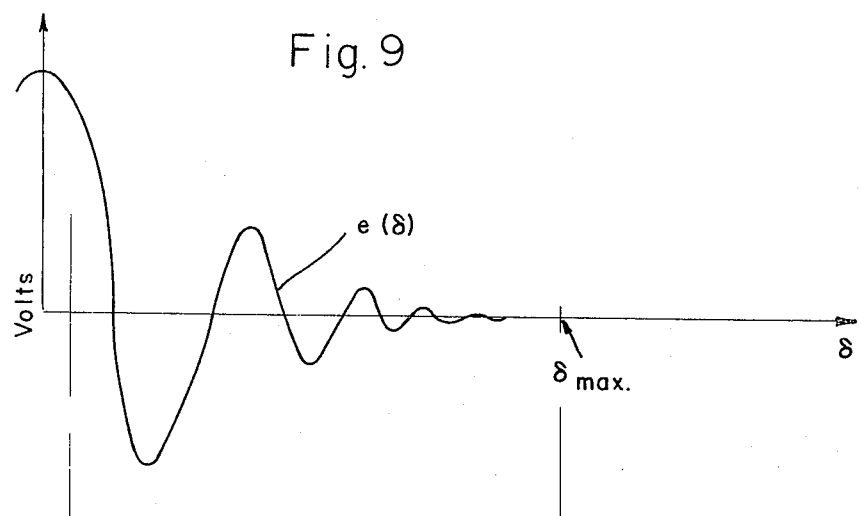

The inverse Fourier transform of $E(\nu)$ is expressed as $e(\delta)$, a typical graphic example of which might be the curve shown in FIG. 9. As is well known, the inverse Fourier transform of $E_o(\nu)*P(\nu)$ is $e_o(\delta)P(\delta)$. Therefore, $e(\delta) = e_o(\delta)p(\delta)$. Now, $E(\nu)$ and $e(\delta)$ are cosine transform pairs, hence $E(\nu)$ may be expressed thus:

$$E(\nu) = 2 \int_0^\infty e(\delta)\cos(4\pi\nu\delta)d\delta.$$

Since $e(\delta) = e_o(\delta)p(\delta)$, and since $p(\delta) = 1$ for $0<\delta<\delta_{max}$, then $e(\delta) = e_o(\delta)$ for $0<\delta<\delta_{max}$ and $e(\delta) = 0$ elsewhere, therefore:

$$E(\nu) = 2 \int_0^{\delta_{max}} e(\delta)\cos(4\pi\nu\delta)d\delta.$$

The information contained in $E(\nu)$ could now be graphically displayed by a frequency analyzer or a computer in the form of a plot of intensity versus frequency. However, this is a costly and time consuming process which is unwarranted when the only information desired is the intensity values at certain preselected frequencies as is the case for engine exhaust analysis or analysis of any other sample in accordance with the teachings of this invention. As discussed previously, typical engine exhaust fumes comprise various pollutants which exhibit strong light absorption characteristics at various absorption frequencies. It is also true that two or more of these pollutants may exhibit a common absorption frequency. However, there can be found at least one infrared absorption frequency for each of these pollutants that is not common to any other pollutant. Such absorption frequencies are referred to herein as characteristic frequencies of the respective pollutants. Each characteristic frequency is distinct; therefore, if the incoherent light entering the absorption chamber is strongly attenuated at a characteristic frequency, the gas corresponding to that frequency is known to be present in the engine exhaust sample being tested. Using a light source which emits incoherent light over a broad continuous band of infrared frequencies ensures the occurrance of the desired strong attenuation at characteristic infrared frequencies when their corresponding gases are present in the sample. The amount of attenuation at any characteristic frequency is a measure of the quantity of the corresponding gas present in the sample. This information will be contained in the components of $E(\nu)$ corresponding to those characteristic frequencies. Consequently, the complete spectrum is not generated. Rather, only the values of $E(\nu)$ at the characteristic frequencies of interest are synthesized from the interferogram $e(\delta)$.

Figure 10:
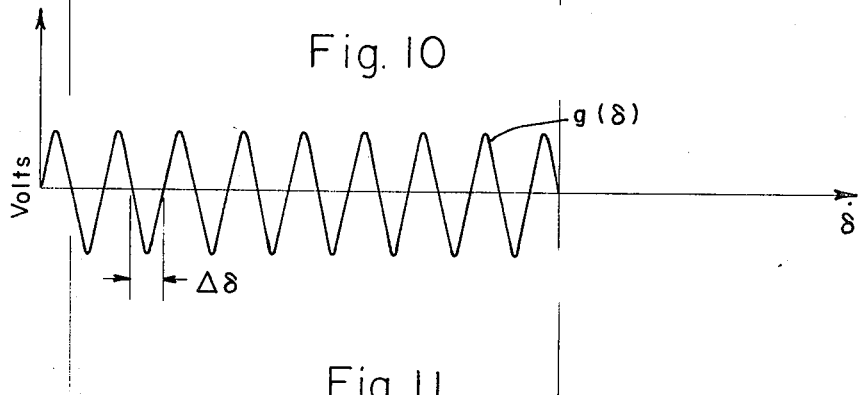

In order to use the transform pair relationship between $e(\delta)$ and $E(\nu)$ to obtain values of $E(\nu)$ at the characteristic frequencies of interest, the independent variable $\delta$ must be monitored, and $e(\delta)$ must be digitized and sampled at regular intervals of $\delta$. This is accomplished with the aid of the coherent light source 108 which generates single frequency light whose frequency spectrum is zero everywhere except at the frequency $\nu_L$. The laser signal is incident on the interferometer, and its emergent interferogram is converted by the detector 116 into an electrical signal $g(\delta)$ (shown in FIG. 10) whose Fourier spectrum is $G(\nu)$. The signal $g(\delta)$ may be amplified, if necessary, by amplifier 118. Now, $g(\delta)$ and $G(\nu)$ are cosine transform pairs, therefore:

$$g(\delta) = 2\int_0^\infty G(\nu)\cos(4\pi\nu\delta)d\nu.$$

The spectrum $G(\nu)$ is described as follows:

$$G(\nu) = G(\nu_L) \text{ for } \nu = \nu_L$$
$$= 0 \text{ for } \nu \neq \nu_L$$

therefore: $g(\delta) = 2G(\nu_L)\cos(4\pi\nu_L\delta)$. Thus, the zero crossings of $g(\delta)$ may be used to mark off equal intervals $\Delta\delta$ of $\delta$, where the incremental mirror position variation $\Delta\delta$ is equal to $\frac{1}{4}\nu_L$. Since the zero crossings occur at every half cycle of the laser interferogram $g(\delta)$, then $e(\delta)$ will be sampled at twice the laser frequency, i.e., at $2\nu_L$.

To avoid the well known, undesirable phenomenon referred to as aliasing, the sampling frequency must be greater than twice the highest frequency present in the sampled signal. (For a discussion of aliasing, see "The Computation of Power Spectra" by Tukey and Blackman.) Therefore, $\nu_L$ must be greater than the highest frequency present in $e(\delta)$.

A continuous range of infrared frequencies is defined which includes at least one characteristic frequency of each suspect gas. The laser 108 is then chosen such that $\nu_L$ is higher than the highest frequency in this range. The optical filter 103 is a high-frequency cutoff filter whose cutoff frequency is less than $\nu_L$ and greater than the highest frequency in the aforementioned continuous range. Thus, the highest frequency present in $e(\delta)$ is constrained to be less than $\nu_L$.

A desirable material for the filter 103 is germanium because it will pass the aforementioned continuous range of infrared frequencies. If the invention were to be used to test for the presence of other gases than engine exhaust fumes, as might well be the case, then another range of characteristic frequencies may be of interest and would probably require another material for filter 103 such that that other range of frequencies will be passed and appear in $e(\delta)$.

A typical gaseous sample to be evaluated might contain carbon monoxide and nitrous oxide which have characteristic frequencies of 2160 waves/cm and 2236 waves/cm, respectively. If sapphire is used for the window of the incoherent light source, the lowest frequency of light would be about 1400 waves/cm, therefore the light would be attenuated by these gases at the aforementioned characteristic frequencies. If the optical filter 103 is of germanium, which passes only frequencies between essentially 500 and 5500 waves/cm, these characteristic frequencies would be passed thereby. Therefore, in this example $e(\delta)$ would contain the desired information at the characteristic frequencies mentioned above.

Figure 11:
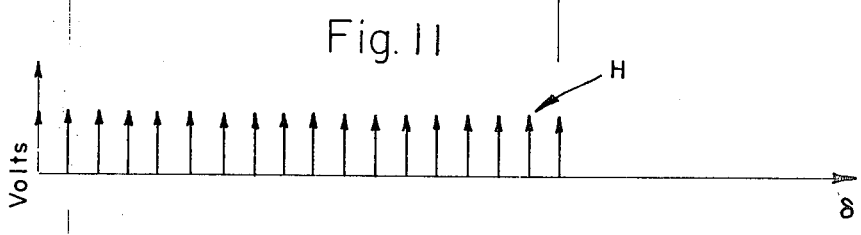
Figure 12:
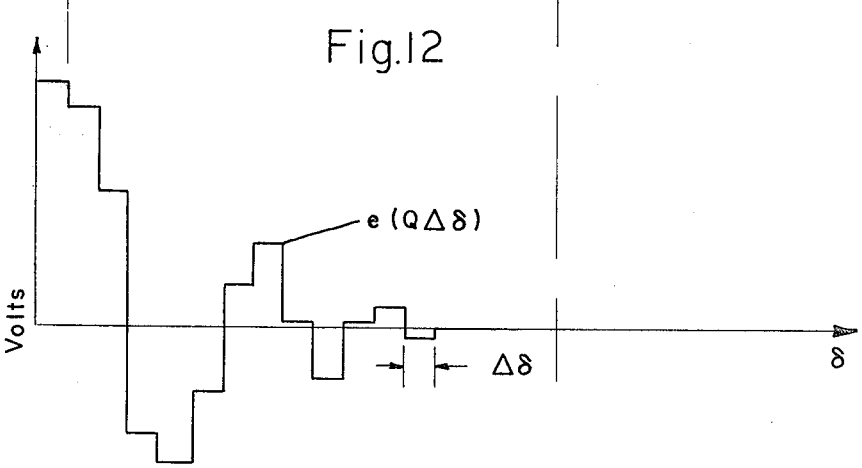
Figure 14:
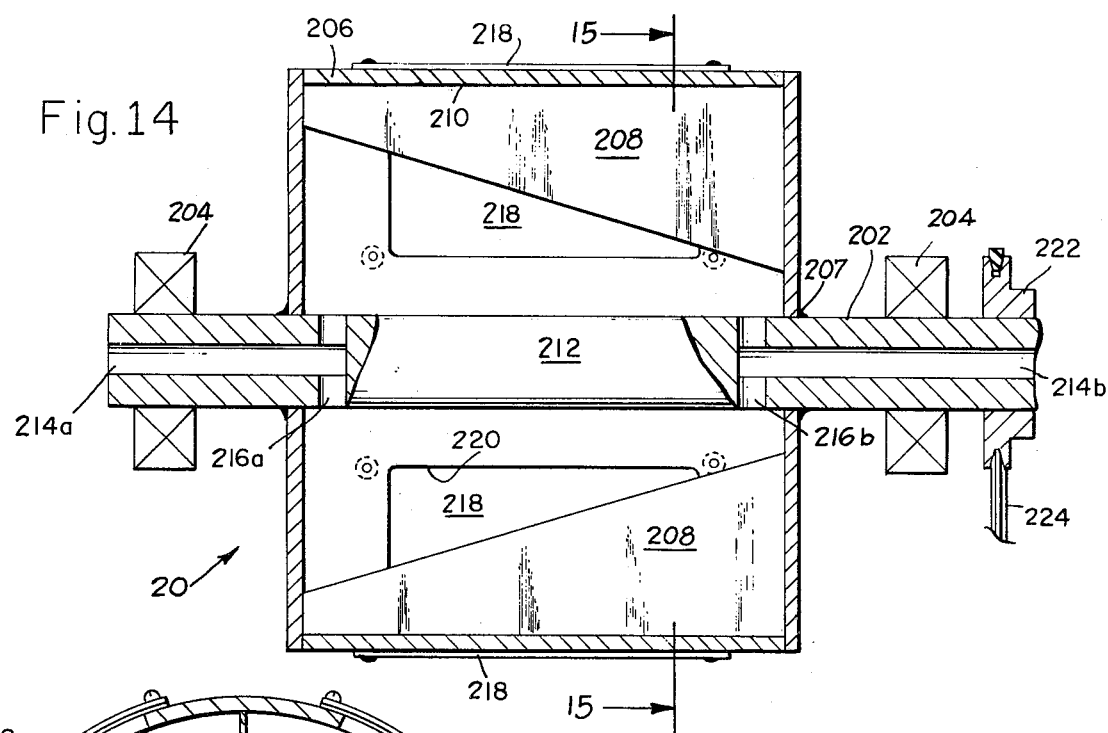
FIG. 14 is a cross-sectional view of the particle separator or filter constructed in accordance with one embodiment of the invention particularly adapted for use enabling the invention to be used as an absorption spectrometer in connection with automobile exhaust emissions.
Figure 15:
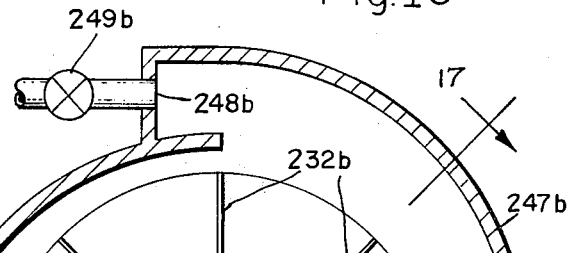
FIG. 15 is a cross-sectional view taken along lines 15—15 of FIG. 14.

The periodic variations produced by the laser beam are amplified and arbitrarily referenced to an average dc level before being applied to movement of the mirror and detector 124, shown in FIG. 1 which detects the periodic variations of $g(\delta)$ and generates a train of impulses H uniformly spaced $\Delta\delta$ apart as shown in FIG. 11. A sample-and-hold circuit 126 is coupled to the zero-crossing detector 124 to receive the impulse train H and to the detector 106 to receive the signal $e(\delta)$ and sample it whenever an impulse occurs. If amplification of $e(\delta)$ is required, the amplifier 107 is coupled between the transducer 106 and the circuit 126. The sampled value of $e(\delta)$ is held until the next impulse occurs. The resultant output signal from the sample-and-hold circuit 126 is a discrete analogue signal $e(Q\Delta\delta)$, shown in FIG. 12, where Q is an integer such that Q-0 when $\delta=0$ and $Q=Q$max when $\delta=\delta$max, and $e(Q\Delta\delta)=e(\delta)$ for $\delta=Q\Delta\delta$.

A conventional analogue-to-digital (A/D) converter 128 converts $e(Q\Delta\delta)$ into a digital signal $N_e(Q\Delta\delta)$ shown in FIG. 13 wherein each group of bits comprises a word describing one held value of $e(Q\Delta\delta)$, the first bit of each group representing positive or negative values. The voltage levels used in $N_e(Q\Delta\delta)$ are either 5 volts or zero, as is common in conventional digital data representation, however, any desired convention compatible with this invention is satisfactory.

The digitized signal $N_e(Q\Delta\delta)$ is coupled to a digital Fourier series frequency component synthesizer 130, a block diagram of which is shown in FIG. 6, to generate the desired frequency components $E(\nu_m)$. As defined herein and in the claims, a digital Fourier series frequency component synthesizer is a device which synthesizes a single frequency component of a frequency spectrum by reconstructing the desired frequency component of the Fourier series representing that spectrum from a digitized representation of the inverse Fourier transform of the spectrum. Thus, if several frequency components are desired, several digital Fourier series frequency component synthesizers are used, one for each separate frequency component. The desired data at each frequency is generated quickly and independently of the other frequency components.

Each pollutant m present in the gaseous sample will have a characteristic frequency $\nu_m$ and will give rise to a component $$E(\nu_m) = \sum_{Q=0}^{Q_{max}} N_e(Q\Delta\delta)\cos(4\pi\nu_m Q\Delta\delta)\Delta\delta.$$

Referring now to FIG. 6 there is shown a counter 132, coupled to the zero-crossing detector 124, which monitors the variable $\delta$ and counts the increments $Q\Delta\delta$ by adding $\Delta\delta$ to the previous sum whenever an impulse is received from the zero-crossing detector. The sum $Q\Delta\delta$ is coupled to a cosine generator 134 which generates $\cos(4\pi\nu_m Q\Delta\delta)$. The value of the cosine for the given value of $Q\Delta\delta$ is coupled to a multiplier circuit 136 which multiplies it with the value of $N_e(Q\Delta\delta)$ received from the A/D converter 128. Each product $N_e(Q\Delta\delta)\cos(4\pi\nu_m Q\Delta\delta)$ is coupled to an adder circuit 138 which adds this value to the previous sum. The latest sum is posted in a shift register 140 which holds it until the next value is received by the adder 138, at which time the previous sum is coupled back to the adder to be added to the next value received from the multiplier. When the value for the maximum mirror excursion $\delta_{max} = Q_{max}\Delta\delta$ has been added, the output signal is $E(\nu_m)$.

Once the various components $E(\nu_m)$ are determined for the engine exhaust sample, the absorption chamber 50 is filled with the diluting air only, and the same procedure is followed. The frequency components obtained the second time will be designated $E_a(\nu_m)$, the subscript $a$ indicating air as the sample.

The purpose of the procedure of this invention is to measure the amount of suspect gas present in the engine exhaust. By comparing $E(\nu_m)$ with $E_a(\nu_m)$, the amount of the gas m present in the air is eliminated, and the amount present in the engine exhaust is determined.

Now, $$E_a(\nu) = A(\nu)S(\nu)*P(\nu)T_a(\nu),$$

and $$E(\nu) = A(\nu)S(\nu)*P(\nu)T(\nu),$$

therefore, $$\frac{E_a(\nu)}{a(\nu)} = \frac{T_a(\nu)}{T(\nu)} = \mathrm{Exp} \sum_{m=1}^{m_{max}} -X_m(\nu)(W_{am}-W_m),$$

and $$\ln E_a(\nu) - \ln E(\nu) = \sum_{m=1}^{m_{max}} -X_m(\nu)(W_{am}-W_m).$$

At the characteristic frequency of each suspect gas the contribution of the term $X_m(\nu)$ due to the other gases will be negligible. Therefore, for a suspect gas $m = n$, only $X_{m=n}(\nu_{m=n})$ need be considered. Consequently, $\ln E_a(\nu_m) - \ln E(\nu_m) = X_m(\nu_m)(W_{am}-W_m)$.

The value of $X_m(\nu_m)$ is known, and $E_a(\nu_m)$ and $E(\nu_m)$ have now been measured by the apparatus of the invention so that $\ln E_a(\nu_m)$ and $\ln E(\nu_m)$ are also known. The term $W_m-W_{am}$ is the amount of suspect gas present in the engine exhaust because it is the amount of suspect gas present in the diluted sample, $W_m$, minus the amount present in the air alone, $W_{am}$. Thus:

$$W_m - W_{am} = \frac{\ln E_a(\nu_m) - \ln E(\nu_m)}{X_m(\nu_m)}$$

which can be readily calculated by conventional circuitry.

An attendant feature of the present invention lies in the fact that the motion of mirror 96 need not be uniform. Indeed, the velocity of the mirror 96 is immaterial because the interferogram $e(\delta)$ is sampled at periodic increments of mirror position. It is true that the actual output of the detector 106 varies with time because the mirror position varies with time. However, by sampling the interferogram at uniform intervals of $\delta$, the effect of any non-uniformity in the mirror motion is overcome.

An additional feature of the invention is that it is self-calibrating; for whenever the absorption chamber 60 is filled with air, the value of $E_a(\nu_m)$ is determined directly. On response to mirror 96 being returned, an additional calibration for background may be incorporated by a sensor which actuates a solenoid operated flag to block all transmission of light from the output of the interferometer.

The use of the interferometer spectrometer in the analysis of automobile exhaust emissions is particularly facilitated by the empolyment of means for cleansing the exhaust of particulate matter before sending the same through the absorption cell. For this purpose reference is made to FIGS. 14 and 15 wherein there is shown a particle separator 201 constructed according to one embodiment of this invention, comprising a shaft 202 rotatably mounted in bearings 204. A drum 206 preferably cylindrical, is rigidly mounted on the shaft 202 by welds 207 or any other suitable means, and has fins 208 affixed to inner longitudinal wall 210 thereof in an inwardly extending and radially spaced fashion. The shaft 202 has a solid portion 212 extending most of the length of the drum 206. Shaft 202 also has hollow portions 214 extending most of the length of the drum 206. Between each end of the solid portion 212 and each hollow portion 214 there is a hole 216 transversely through the shaft 202, whereby the hollow portions 214 communicate with the inside of the drum 206. Cover plates 218 are shown covering openings 220 in the wall 210 between adjacent fins 208.

A sample gaseous mixture flows into the drum 206 via one hollow portion 214a of the shaft 202 and through the entrance hole 216a. The drum 206 is rotated by means of a pulley 222 which is attached to the shaft 202. The pulley 222 is coupled to a conventional external source of rotational energy (not shown) via a belt 224. As the drum 206 rotates, any particles in the sample will experience a centrifugal force pushing them to the wall 210, where they will accumulate and be removed ultimately through openings 220 when the accumulation is to great to allow further satisfactory separation.

The fins 208 are designed narrower at one end, as shown, in order to facilitate separation. The larger particles tend to accumulate where the fins 208 are narrowest, and the smaller particles where they are widest. The larger particles, being heavier, will collect sooner, therefore, as the sample progresses down the length of the drum 206 the particles remaining in suspension will be more predominently smaller. That is why the narrower portion of the fins 208 are at the entrance of the drum 206. As the sample approaches the exit hole 216b it is virtually devoid of undesirable solid particles. The separated gas then flows out the exit hole 216b and is collected as desired.

Figure 17:
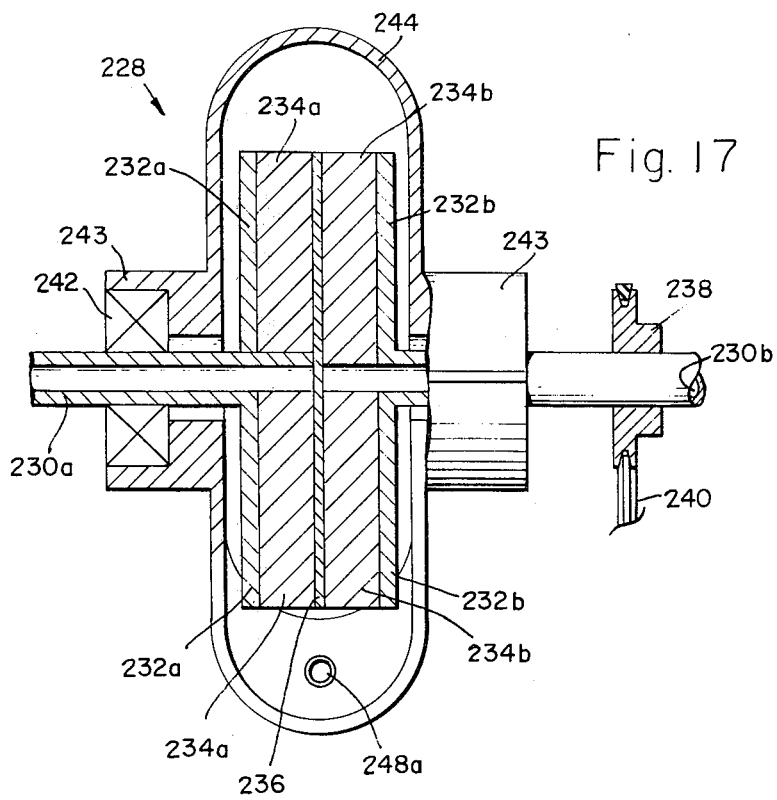
FIG. 17 is a cross-sectional view taken along lines 17—17 of FIG. 16.
Figure 16:
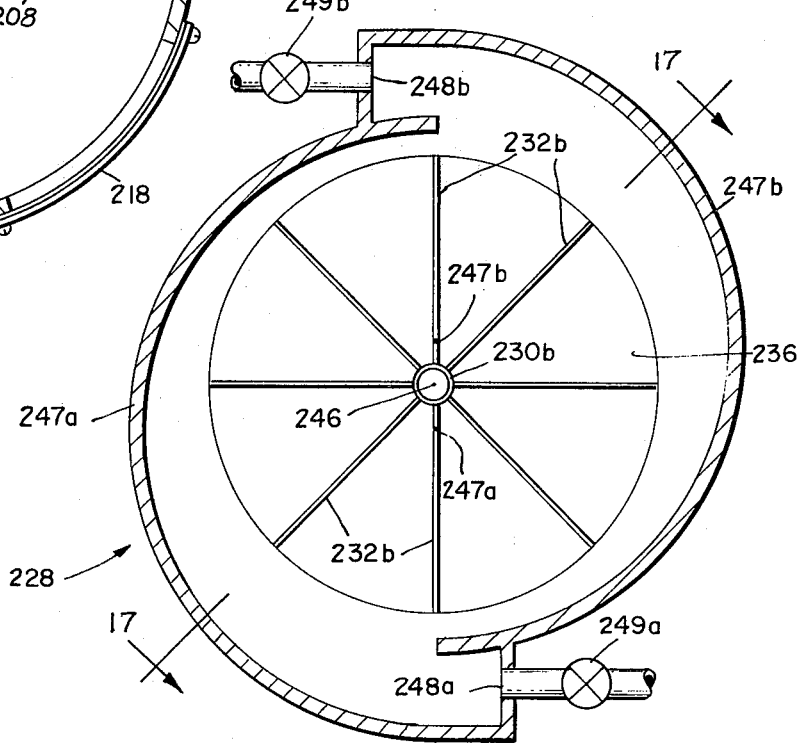
FIG. 16 is a cross-sectional view of another embodiment of said particle filter constructed in accordance with the present invention.

In FIGS. 16 and 17 is shown an alternative particle filter 228 having two hollow axles 230a and b which terminate in a set of ribs 232a and b, respectively, radially spaced thereabout and extending laterally therefrom. The ribs 232a and b are connected to the edges of a set of baffle plates 234a and b, respectively. The plates 234a and b are rigidly mounted edgewise on either side of a disc 236 along evenly spaced radii of the disc 236, the number of plates 234 equalling the number of ribs 232. A pulley 238, coupled to a conventional external source of rotational energy (not shown) by means of a belt 240, causes the axle 230b to rotate. The ribs 232b are rigidly connected to the plates 234b so that the disc 236 rotates with the axle 230b. Similarly, the ribs 232a are rigidly connected to plates 234a so that axle 230a rotates with axle 230 b and disc 236.

The axles 230 are rotatably mounted in bearings 42 which, in turn, are seated in the side portions 243 of a housing 244 whose end view resembles a squat drum, and which consists of two equal sized hemi-cylindrical portions 245a and b fitted together eccentrically so that a diameter taken through the midpoint 246 between the centers of curvature 247a and b of the two portions 245a and b, respectively, increases helically. The diameter has two values where the two portions interface as shown in FIG. 16, these values being the smallest and the largest. Associated with each hemi-cylindrical portion 245a and b are particle exhaust ports 248a and b, respectively, coupled to valves 249a and b, respectively.

In this embodiment the gaseous sample flows through the first hollow axle 230a into the housing 244. As the pulley 240 turns the axle 230a the disc 236 turns, causing the baffle plates 234 to create a centrifugal force on particles in the sample. These particles collect along the inside of the housing, and are removed through the exhaust ports 248 by suction when the valves 249 are opened. In this embodiment, the particles can be removed even while the disc 236 is spinning.

It is not necessary for the hemi-cylindrical portions 245 to be connected eccentrically as shown. The housing 244 could have a uniform diameter, and could also have a series of exhaust ports uniformly spaced about its perimeter. A manifold can be connected to such ports and suction can be applied therethrough to the particles via a valve.

The particle filters 201 and 228 are each designed to separate out particles whose diameters are larger than about $8 \times 10^{-6}$ cm, this length being essentially 1/10 the smallest wavelength of the infrared light.

This invention is not limited to measuring engine exhaust samples. Any gaseous sample may be tested in the aforementioned manner to determine the presence of particular components of the sample. Thus, for example, the presence and amount of water vapor or carbon monoxide, etc., in the air can be determined. Furthermore, the invention is well suited to determine the presence and amount of particular discrete frequency components of a given light spectrum, such as, for example, the light from a distant star. When the light itself is of interest, the absorption cell is not used, and the light is incident directly on the interferometer.

There has thus been shown and described a gas analyzer for determining the presence and amount of certain components of a gaseous sample by generating and digitizing the inverse Fourier transform of the spectrum of light attenuated by the gaseous sample and then synthesizing those frequency components of the attenuated light corresponding to those certain gaseous components by means of a digital Fourier series frequency component synthesizer.

Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed in a limiting sense.

What is claimed is:

1. A gas analyzer for determining the presence and amount of certain components of a gaseous sample comprising:
   a container having gas entrance and exit ports;
   incoherent light furnishing means coupled to said container for introducing incoherent light through said sample to emerge as an output therefrom;
   interferometric means optically coupled to said container for optically processing the output light emerging from said sample, said interferometric means being a moving mirror Michelson interferometer;
   a coherent light source optically coupled to said interferometric means, the coherent light emanating therefrom being optically processed thereby;
   optical filter means coupled to said interferometric means for optically eliminating from said optically processed light all light whose frequency is at least equal to the frequency of said coherent light;
   first transducive means electro-optically coupled to said interferometric means for converting said optically processed light emerging from said sample into a first analogue electric signal whose amplitude varies with the position of said moving mirror and which contains spatial frequency information concerning said light emerging from said sample in essentially the inverse Fourier transform of the spatial frequency spectrum of said light;
   second transducive means electro-optically coupled to said interferometric means for converting said optically processed coherent light into a second

15 electrical signal which periodically crosses zero as said mirror moves through an increment of length $\Delta\delta$, $\delta$ being the distance said mirror has moved from its initial position;

zero-crossing detector means coupled to said second transducive means for detecting the zero-crossings of said second signal;

sampling means coupled to said first transducive means and to said detector means for sampling the value of said first electrical signal upon the occurrance of each of said zero crossings and holding that value until the next zero crossing occurs;

transformation means coupled to said sampling means for generating a discrete electrical signal whose amplitude variation represents the inverse Fourier transform of the spatial frequency spectrum of said attenuated light;

an analog-to-digital converter electrically coupled to said transformation means; and synthesizing means coupled to said analog-to-digital converter for synthesizing preselected frequency components of said spectrum.

2. The gas analyzer claimed in claim 1 further including particle separator means coupled between the source of said sample and said gas entrance port for separating from said gaseous sample particles whose diameters are greater than one-tenth the smallest wavelength of the light passed through said sample, and for preventing said particles from entering said container, said separation being achieved by centrifugal force.

3. The gas analyzer claimed in claim 2 wherein said separator means comprises:
a rotatable shaft having first and second hollow portions each terminating in a transverse hole therethrough, and having a solid portion between said transverse holes;
a drum rigidly affixed coaxially to said shaft, said hollow portions communicating with and extending from either end of said drum;
rotational means associated with said shaft for coupling rotational energy to said shaft; and
particle removal associated with said drum for removing accummulated particles from said drum.

4. The gas analyzer claimed in claim 2 wherein said separator means comprises:
a disc having first and second sets of radially spaced baffle plates extending laterally from first and second sides thereof, respectively;
first and second hollow axles terminating at one end in first and second sets of laterally extending radially spaced ribs, respectively, said first and second sets of ribs being affixed to and equal in number to said first and second sets of baffle plates, respectively;
a housing having first and second bearings in which are rotatably seated said first and second axles, respectively, said housing containing said disc and said ribs such that said disc can rotate within said housing;
rotational means associated with said axles for coupling rotational energy to said axles; and
particle removal means associated with said housing for removing accumulated particles from said housing while said disc rotates.

5. The gas analyzer claimed in claim 1 wherein said container comprises:
a White cell coupled between said ports, and having curved mirrors mounted on opposite walls thereof essentially opposite one another constituting a folded optical path, and having light entrance and exit windows;
turbulence damping means associated with said gas entrance ports for damping the turbulence of the gas entering said entrance port;
laminar flow means disposed between said turbulence damping means and said White cell for laminating the flow of said gas; and
air flow means associated with said White cell for directing the flow of air across each of said mirrors.

6. The gas analyzer claimed in claim 1 wherein said light furnishing means comprises:
an evacuated housing;
a black-body radiator disposed within and apart from said housing;
heating means coupled to said radiator for heating said radiator; and
a transmission window transparent to the radiation from said radiator and disposed in a side of said housing adjacent said radiator.

7. The gas analyzer claimed in claim 6 wherein said radiator is of refractory metal in the form of a hollow structure with a pinhole in a side thereof adjacent said transmission window.

8. The gas analyzer claimed in claim 7 wherein said refractory metal is tungsten, and said transmission window is of sapphire.

9. The gas analyzer claimed in claim 1 wherein said synthesizing means comprises:
counting means coupled to said zero-crossing detector means for counting said zero-crossings and generating numbers $Q\Delta\delta$ where $Q$ is an integer which varies from zero to $Q_{max}$ as said mirror moves through said increments $\Delta\delta$ from an initial position $\delta = 0$ to a final position $\delta = Q_{max}\Delta\delta$;
cosine generating means coupled to said counting means for generating the value of the cosine, $\cos(4\pi\nu_m Q\Delta\delta)$, at the preselected frequency $\nu_m$ for each integral multiple $Q\Delta\delta$ of said $\Delta\delta$;
multiplicative means coupled to said converter and to said cosine generating means for generating the products of each cosine value with each corresponding digital number $N_e(Q\Delta\delta)$ from said converter, said digital numbers $N_e(Q\Delta\delta)$ corresponding to said sampled values of said first electrical signal; and
additive means coupled to said multiplicative means for generating the sum of said products, $$\sum_{Q=0}^{Q_{max}} N_e(Q\Delta\delta)\cos(4\pi\nu_m Q\Delta\delta).$$

10. Apparatus for measuring the value of a light spectrum at preselected frequencies comprising:
an interferometer having a linearly movable mirror, and means for receiving an incoming light spectrum;
a coherent light source coupled to said interferometer for furnishing an essentially single frequency light signal whose frequency is higher than the highest of said preselected frequencies;
first transducive means coupled to said interferometer for converting into a first electric signal a first interferogram resulting from the operation of said interferometer on said light spectrum;

second transducive means coupled to said interferometer for converting into a second electric signal a second interferogram resulting the operation of said interferometer on said single frequency light signal, the amplitude of said second electric signal as a function of the position of said mirror being zero periodically;

zero detecting means coupled to said second transducive means for detecting zero-crossings of said second electric signal;

sampling means coupled to said zero detecting means and to said first transducive means for sampling the amplitude of said first electric signal at each said zero-crossing and holding said amplitude until the next zero-crossing to generate a discrete analog signal;

an analog-to-digital converter coupled to said sampling means for digitizing said discrete signal; and a digital Fourier series frequency component synthesizer coupled to said analog-to-digital converter and to said zero detecting means for synthesizing preselected frequency components of said light spectrum.

11. The apparatus claimed in claim 10 wherein said digital Fourier series frequency component synthesizer comprises:

counting means coupled to said zero-crossing detector means for counting said zero-crossings and generating numbers $Q\Delta\delta$ where $Q$ is an integer which varies from zero to $Q_{max}$ as said mirror moves through said increments $\Delta\delta$ from an initial position $\delta = 0$ to a final position $\delta = Q_{max}\Delta\delta$;

cosine generating means coupled to said counting means for generating the value of the cosine, $\cos(4\pi\nu_m Q\Delta\delta)$, at the preselected frequency $\nu_m$ for each integral multiple $Q\Delta\delta$ of said $\Delta\delta$;

multiplicative means coupled to said converter and to said cosine generating means for generating the products of each cosine value with each corresponding digital number $N_e(Q\Delta\delta)$ from said converter, said digital numbers $N_e(Q\Delta\delta)$ corresponding to said sampled values of said first electrical signal; and additive means coupled to said multiplicative means for generating the sum of said products, $$\sum_{Q=0}^{Q_{max}} N_e(Q\Delta\delta)\cos(4\pi\nu_m Q\Delta\delta).$$

12. A method for measuring the amplitude of preselected frequency components of a light input signal using an interferometer with a moveable mirror, comprising:

directing said light input signal through said interferometer and moving said mirror to produce an interferogram converting said interferogram into an analogue electrical signal whose amplitude as a function of the position of said mirror is the inverse Fourier transform of the spatial frequency spectrum of said light input signal directing coherent light of essentially single frequency through said interferometer to produce a periodic and varying signal as a function of the position of said mirror, the frequency of said periodic signal being greater than the highest frequency present in said analogue signal detecting the periodic variations of said varying signal and generating electrical sampling pulses as a regular function of said period variations sampling said analogue signal in response to each sampling pulse and holding said sample until the next sample pulse to generate a discrete analogue electrical signal representative of said analogue electrical signal converting said analogue electrical signal into a digital signal synthesizing preselected spatial frequency components of said spatial frequency spectrum from said digitized signal by counting said sampling pulses of said variations and generating numbers $Q\Delta\delta$ where $Q$ is an integer which varies from zero to $Q_{max}$ as said mirror moves through increments $\Delta\delta$ from an initial position $\delta=0$ to a final position $\delta=Q_{max}\Delta\delta$.

generating the value of $\cos(4\pi\nu_m Q\Delta\delta)$ at the preselected frequency $\nu_m$ for each integral multiple $Q\Delta\delta$ of said $\Delta\delta$ multiplying each cosine value with each corresponding digital number to form the products $N_e(Q\Delta\delta)\cos(4\pi\nu_m Q\Delta\delta)$ and adding said products to form said frequency component.

* * * * *